US012473992B2

(12) United States Patent
Ripberger, Jr. et al.

(10) Patent No.: US 12,473,992 B2
(45) Date of Patent: Nov. 18, 2025

(54) THERMOSTAT WITH FLOW REGULATORS

(71) Applicant: Stant USA Corp., Connersville, IN (US)

(72) Inventors: John W. Ripberger, Jr., Connersville, IN (US); J Bradley Groom, Oxford, OH (US)

(73) Assignee: Stant USA Corp., Connersville, IN (US)

( * ) Notice: Subject to any disclaimer, the term of this patent is extended or adjusted under 35 U.S.C. 154(b) by 257 days.

(21) Appl. No.: 18/137,413

(22) Filed: Apr. 20, 2023

(65) Prior Publication Data

US 2023/0341063 A1  Oct. 26, 2023

Related U.S. Application Data

(60) Provisional application No. 63/333,525, filed on Apr. 21, 2022.

(51) Int. Cl.
*F01P 7/16* (2006.01)
*F16K 1/42* (2006.01)
*F16K 1/44* (2006.01)
*F16K 1/46* (2006.01)
*F16K 31/00* (2006.01)
*G05D 23/02* (2006.01)

(52) U.S. Cl.
CPC .............. *F16K 31/002* (2013.01); *F01P 7/16* (2013.01); *F16K 1/42* (2013.01); *F16K 1/44* (2013.01); *F16K 1/465* (2013.01); *G05D 23/022* (2013.01)

(58) Field of Classification Search
CPC .......... G05D 23/022; F16K 1/44; F16K 1/465
See application file for complete search history.

(56) References Cited

U.S. PATENT DOCUMENTS

| 4,053,105 | A |   | 10/1977 | Wong et al. |
|---|---|---|---|---|
| 4,055,323 | A | * | 10/1977 | Gachot ................. F16K 1/2263 251/306 |
| 4,091,991 | A | * | 5/1978 | Sliger .................. G05D 23/022 236/34.5 |
| 4,164,322 | A |   | 8/1979 | Wilson et al. |
| 4,280,655 | A |   | 7/1981 | Duprez et al. |
| 4,286,750 | A |   | 9/1981 | Wong et al. |
| 4,304,321 | A |   | 12/1981 | Wong |
| 4,562,953 | A |   | 1/1986 | Duprez et al. |
| 4,691,861 | A |   | 9/1987 | Sliger et al. |
| 4,763,834 | A |   | 8/1988 | Duprez |
| 5,083,705 | A |   | 1/1992 | Kuze |
| 5,381,952 | A |   | 1/1995 | Duprez |
| 5,410,991 | A |   | 5/1995 | Beaudry et al. |

(Continued)

FOREIGN PATENT DOCUMENTS

WO   1997/011262 A1   3/1997

*Primary Examiner* — Jerry-Daryl Fletcher
*Assistant Examiner* — Daniel C Comings
(74) *Attorney, Agent, or Firm* — Barnes & Thornburg LLP

(57) ABSTRACT

A thermostatic control device according to the present disclosure is configured to control the flow of coolant fluid from a reservoir through a heat exchanging circuit and/or a bypass back to a cooling circuit pump. The device controls the flow of coolant fluid based on temperature of the coolant fluid at the device. The thermostatic control device includes a thermostatic valve with notches that allow metered flow of coolant fluid to the heat exchanging circuit during opening of the thermostatic valve.

10 Claims, 8 Drawing Sheets

(56) References Cited

U.S. PATENT DOCUMENTS

| | | | |
|---|---|---|---|
| 5,549,244 A * | 8/1996 | Kai | F01P 7/16 |
| | | | 165/300 |
| 5,799,625 A | 9/1998 | Leszek et al. | |
| 5,971,288 A | 10/1999 | Davis et al. | |
| 6,742,716 B1 | 6/2004 | Duprez et al. | |
| 6,764,020 B1 | 7/2004 | Zhao et al. | |
| 6,942,221 B2 | 9/2005 | Keeley et al. | |
| 9,217,358 B2 | 12/2015 | Park | |
| 9,453,455 B2 | 9/2016 | Lewis et al. | |
| 10,386,870 B2 * | 8/2019 | Roman | G05D 23/022 |

\* cited by examiner

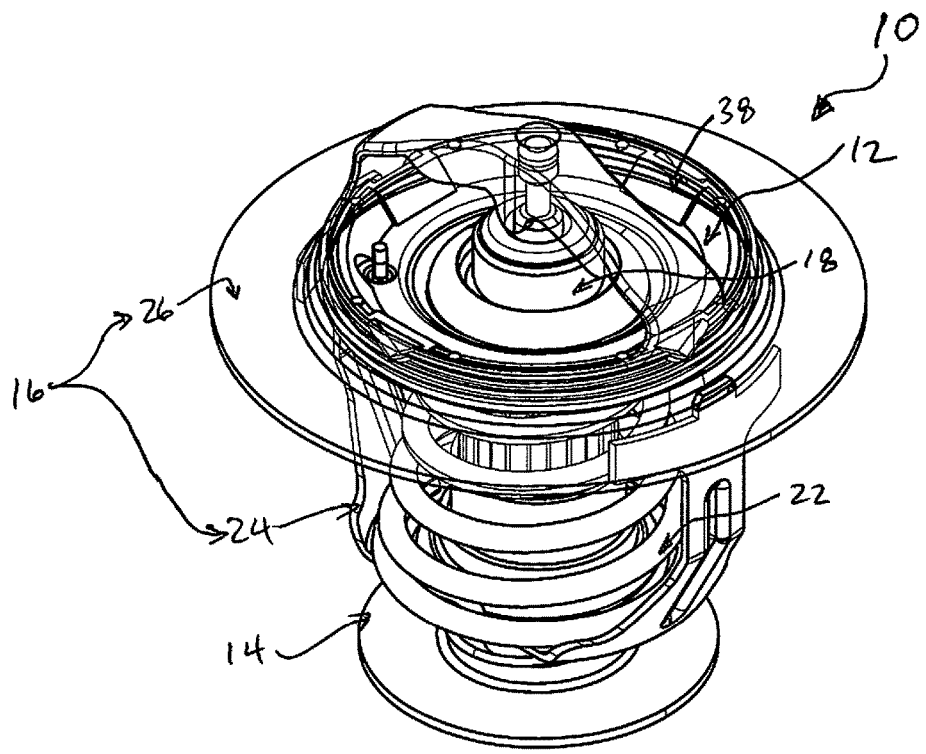
FIG. 9
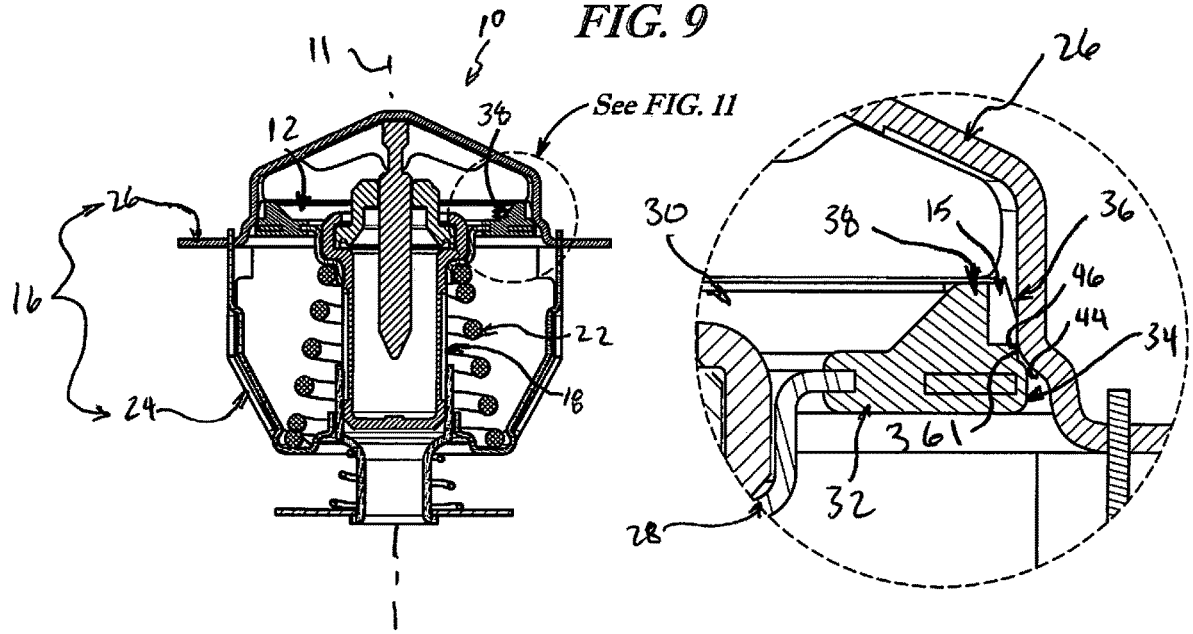
FIG. 10
FIG. 11

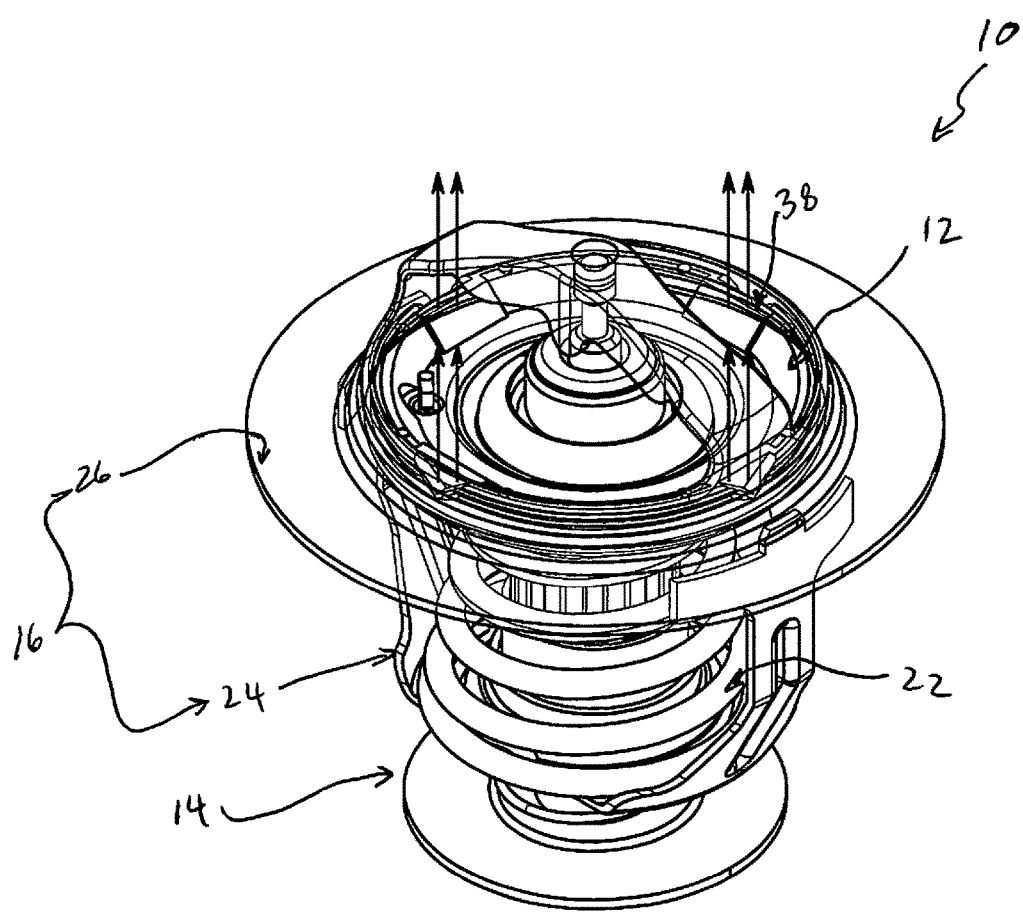
FIG. 12
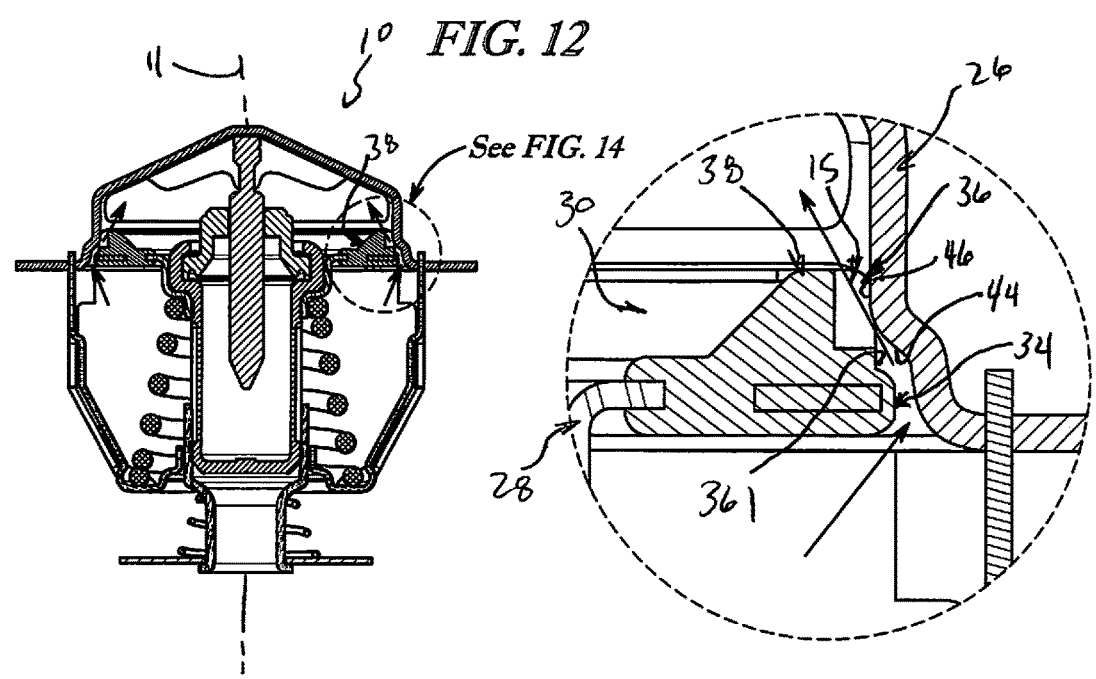
FIG. 13
FIG. 14

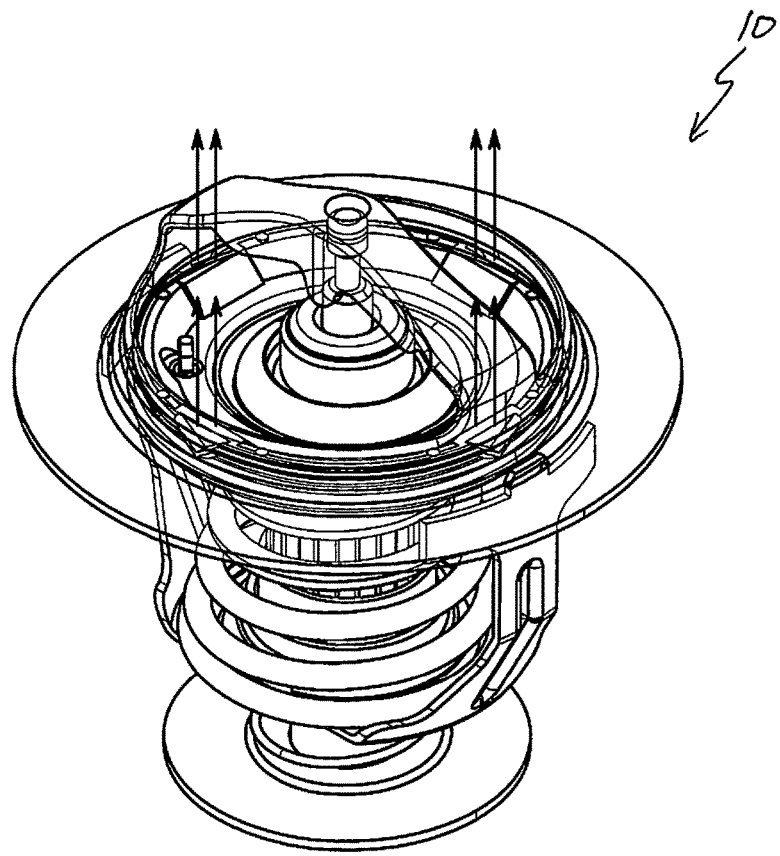
FIG. 15
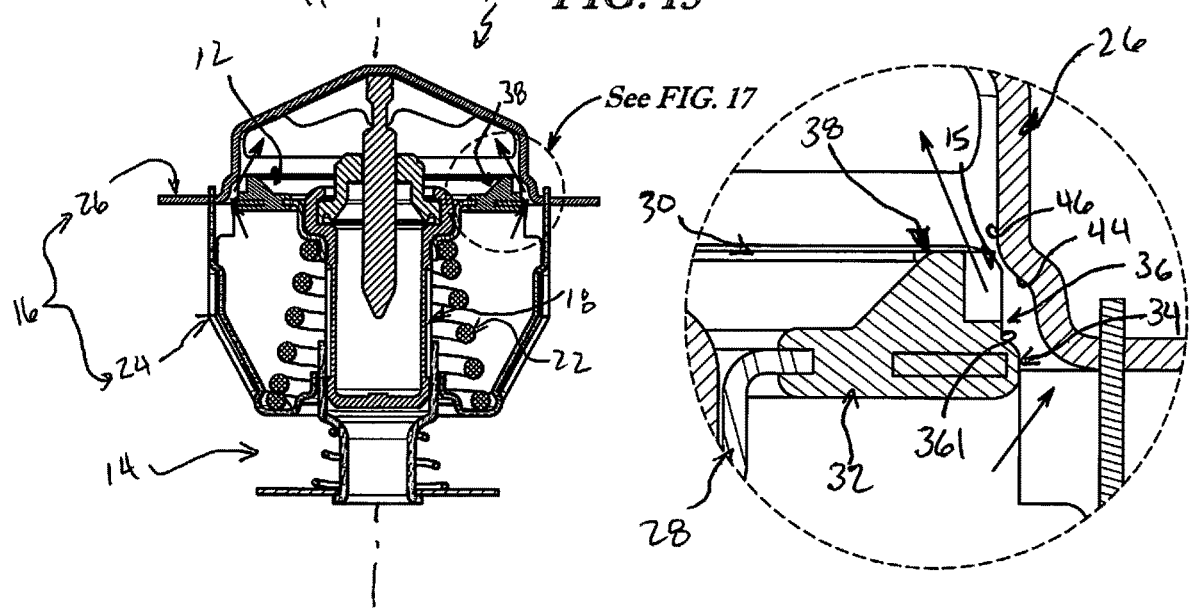
FIG. 16  FIG. 17

THERMOSTAT WITH FLOW REGULATORS

PRIORITY CLAIM

This application claims priority under 35 U.S.C. § 119(e) to U.S. Provisional Application Ser. No. 63/333,525, filed Apr. 21, 2022, which is expressly incorporated by reference herein.

BACKGROUND

The present disclosure relates to a thermostatic control valve for controlling fluid flow through a cooling system of an engine. More particularly, the present disclosure relates to a thermostat with features formed in the valve that carry cooling fluid across the valve when the valve is moving from a closed position to an opened position.

SUMMARY

A thermostatic control device according to the present disclosure is configured to control the flow of coolant fluid from a reservoir through a heat exchanging circuit and/or a bypass back to a cooling circuit pump. The device controls the flow of coolant fluid based on temperature of the coolant fluid at the device.

In illustrative embodiments, the thermostatic control device includes a thermostatic valve with notches that allow metered flow of coolant fluid to the heat exchanging circuit during opening of the thermostatic valve. By metering flow during opening, oscillation or rapid opening/closing movement of the valve can be avoided during the transition from a fully closed position of the thermostatic valve to a fully opened position of the thermostatic valve.

In illustrative embodiments, the thermostatic valve includes a primary seal ring and metering means for allowing metered flow of the cooling fluid through the thermostatic valve during motion of the thermostatic valve from the fully closed position to the fully opened position. The metering means regulates the metered flow of cooling fluid based on the position of the thermostatic valve. In particular, the exemplary valve continues to block flow upon disengagement of the primary seal ring and then restricts the flow of the metered cooling fluid to discrete, spaced-apart circumferential locations around the thermostatic valve during movement to the fully opened position. Thus, the metered flow excludes flows of coolant that can pass through uncontrolled annular, or partially annular, gaps between the thermostatic valve and a valve seat which can lead to undesirable oscillation of the valve.

In illustrative embodiments, the metering means for regulating metered flow through the thermostatic valve during opening is provided by flow regulators and a secondary seal ring. The flow regulators define the notches carrying metered flow across the valve at discrete locations. The secondary seal ring that remains in contact with the valve seat during opening of the thermostatic valve, even after the primary seal is disengaged, so that to block undesired flow circumferentially between the flow regulators. In this way, the secondary seal ring contributes to restricting the metered flow to the discrete circumferential locations of the flow regulators.

In illustrative embodiments, the primary seal ring, the flow regulators, and the secondary seal ring are integrated into an over-molded seal element coupled to a metallic insert ring. The flow regulators are shaped to increase the amount of metered flow moving across the valve during opening of the thermostatic valve to gradually increase the amount of heat removed across the heat exchanger circuit.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a thermostatic control device configured to control the flow of coolant fluid from a reservoir through a heat exchanging circuit and/or a bypass back to cooling circuit pump based on temperature of the coolant fluid, the thermostatic control device including a thermostatic valve with flow regulators formed in an over-molded sealing element that provide notches shaped to allow flow of coolant during opening of the thermostatic valve only at circumferentially spaced apart locations around the thermostatic valve so that the flow of coolant during opening is regulated by the flow regulators and avoids excess flow of coolant at circumferential locations between the flow regulators until the thermostatic valve is fully open thereby avoiding oscillation of the thermostatic valve that can be caused by excess flow of coolant fluid during opening;

Figure 4:
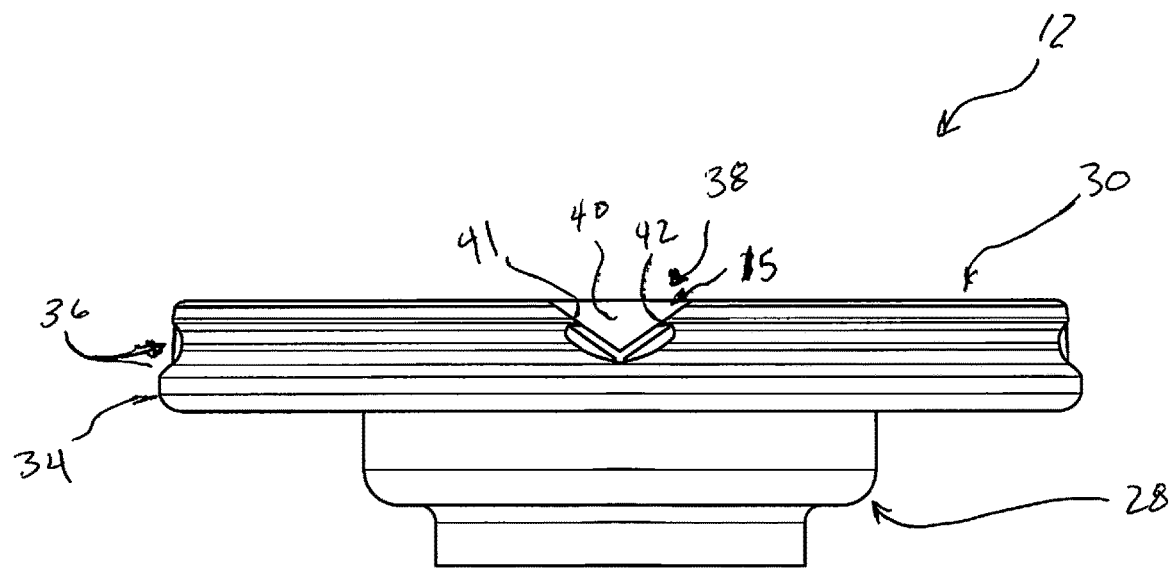
FIG. 4 is an enlarged front elevation view of the thermostatic valve from FIG. 3 showing that the thermostatic valve is made up of a metal insert ring and the over-molded seal element.
Figure 5:
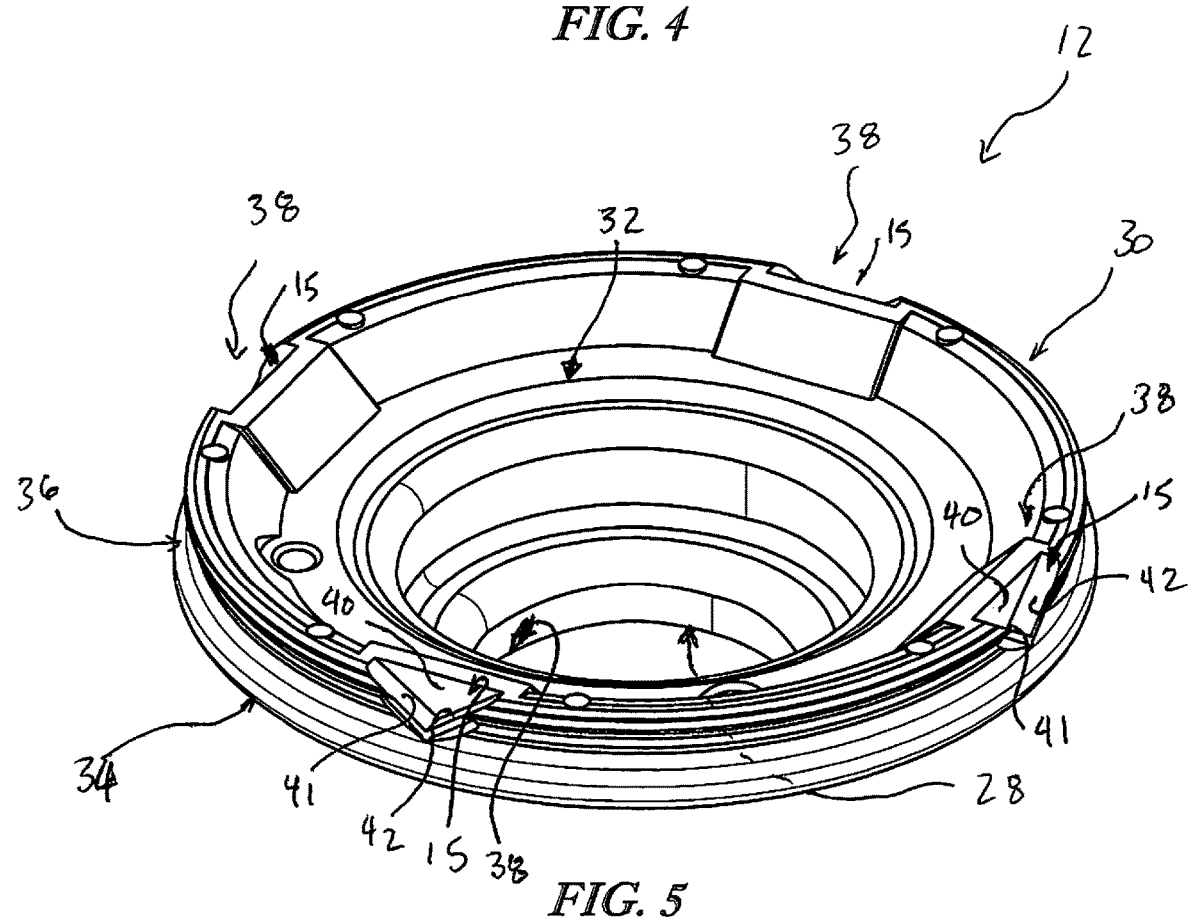
Figure 6:
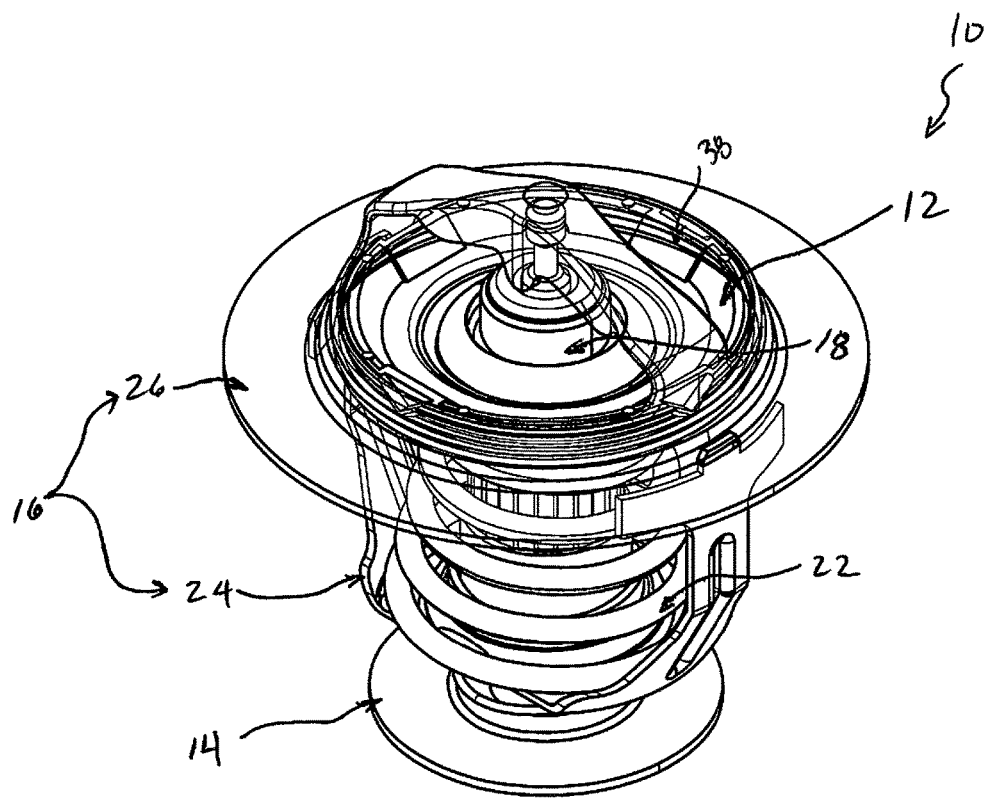
Figures 7, 8:
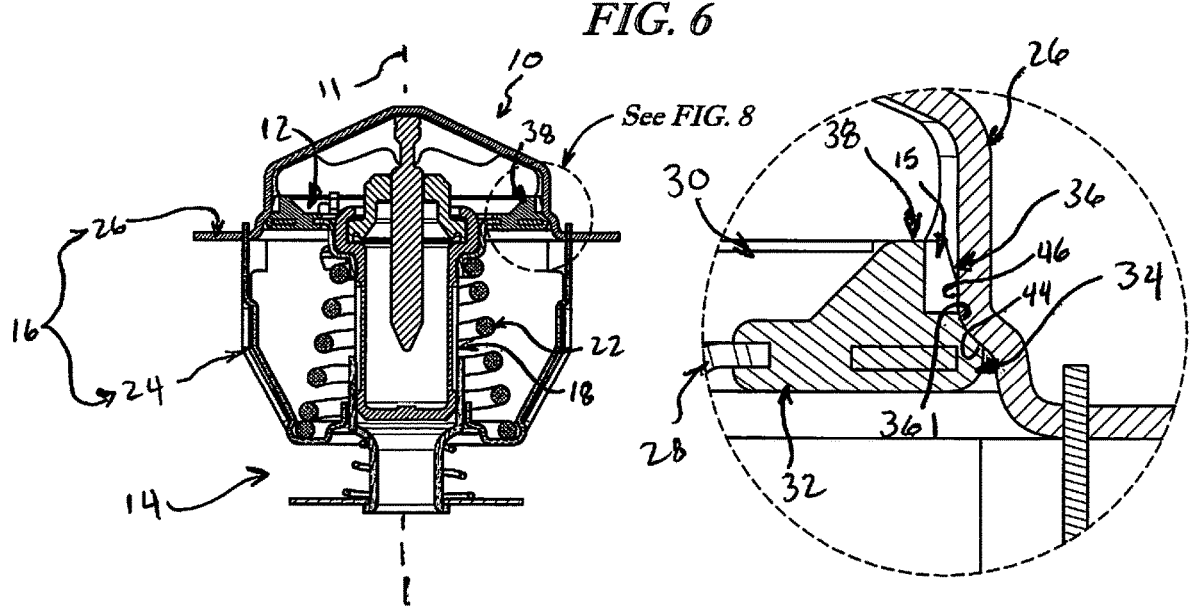
Figure 18:
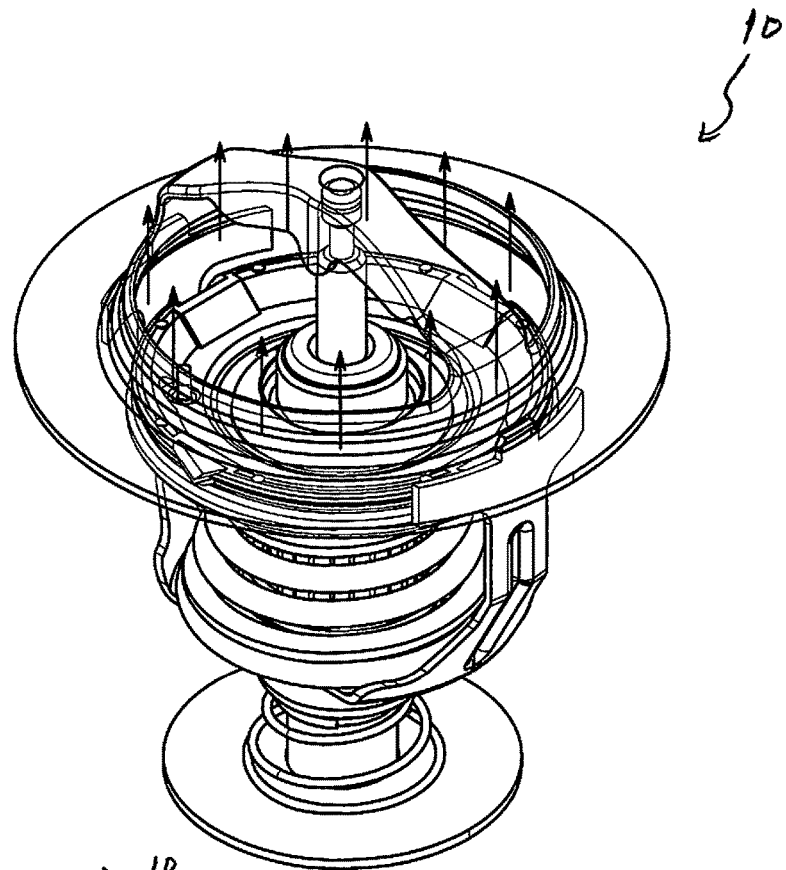
Figures 19, 20:
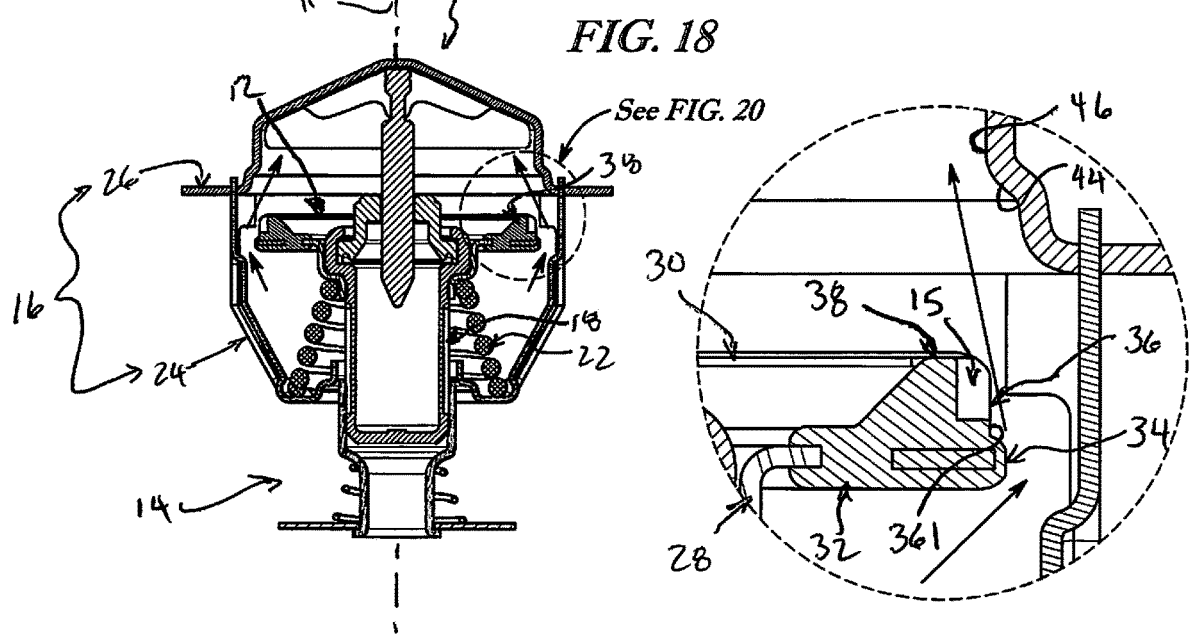

FIG. 5 is a perspective view of the thermostatic valve of FIG. 4, showing that the over-molded seal element includes a seal body engaged with the metal insert ring, a primary seal ring that extends radially outwardly from the seal body, a secondary seal ring spaced from the primary seal ring that extends radially outwardly from the seal body to form a channel between the primary and secondary seal rings, and a plurality of circumferentially spaced apart flow regulators that interrupt the secondary seal ring at discrete circumferential locations, the flow regulators being defined by an interior wall and side walls that extend from the seal body so that controlled flow notches are separated from the channel between the primary and secondary seal rings;

FIG. 6 is a perspective view of the thermostatic control device with the housing cap rendered transparent to show the thermostatic valve in the fully closed position;

FIG. 7 is a cross-sectional view of the thermostatic control device of FIG. 6 showing that the valve actuator includes a closed cup coupled to the thermostatic valve and a stem that extends from the closed cup to the housing cap, the closed cup being configured to be filled with thermally expandable wax that pushes the stem outwardly upon heating of the cup to drive movement of the thermostatic valve from the fully closed position toward the fully opened position;

FIG. 8 is a detail view of a portion of FIG. 7 showing the primary seal ring, the flow regulators, and the secondary seal ring of the over-molded sealing element included in the thermostatic valve engaged with the valve seating surfaces of the housing cap so that flow of cooling fluid is blocked from passing the by the thermostatic valve;

FIG. 9 is a perspective view of the thermostatic control device with the housing cap rendered transparent to show the thermostatic valve in a pre-opening position;

FIG. 10 is a cross-sectional view of the thermostatic control device of FIG. 9 showing that the valve actuator has started motion of the stem to drive movement of the thermostatic valve from the fully closed position to the pre-opening position in which the primary seal ring is disengaged from the valve seating surfaces of the housing cap but fluid flow is still blocked from passing the by the thermostatic valve by an annular, uninterrupted portion of the secondary seal ring arranged between the primary seal and the flow regulators;

FIG. 11 is a detail view of a portion of FIG. 10 showing the thermostatic valve in the pre-opening position, in which the primary seal ring is disengaged from the valve seating surfaces of the housing while the side walls of flow regulators and the annular, uninterrupted portion of the secondary seal of the secondary seal ring remain engaged with the valve seating surfaces of the housing cap so that flow of cooling fluid is blocked from passing through the thermostatic valve;

FIG. 12 is a perspective view of the thermostatic control device with the housing cap rendered transparent to show the thermostatic valve in a first, low-flow opening position;

FIG. 13 is a cross-sectional view of the thermostatic control device of FIG. 12 showing that the valve actuator has extended the stem to drive movement of the thermostatic valve from the pre-opening position to the first opening position in which the primary seal ring is disengaged from the housing cap and the flow regulators have started to allow a low-level metered fluid flow to pass through the thermostatic valve and the secondary seal ring maintains engagement with the housing cap to restrict flow to the at discrete circumferential locations of the flow regulator notches;

FIG. 14 is a detail view of a portion of FIG. 13 showing the thermostatic valve in the first opening position, in which the primary seal ring is disengaged from the housing cap while the side walls of flow regulators are partially engaged with the seating surfaces of the housing to allow a low-level metered fluid flow to pass through the thermostatic valve and the secondary seal ring maintains engagement with the housing cap to restrict flow to the at discrete circumferential locations of the flow regulator notches;

FIG. 15 is a perspective view of the thermostatic control device with the housing cap rendered transparent to show the thermostatic valve in a second, high-flow opening position;

FIG. 16 is a cross-sectional view of the thermostatic control device of FIG. 15 showing that the valve actuator has extended the stem to drive movement of the thermostatic valve from the first opening position to the second opening position in which the primary seal ring is disengaged from the valve seating surfaces of the housing cap and the flow regulators allow a high-level metered fluid flow to pass through the thermostatic valve and the secondary seal ring maintains engagement with the housing cap to restrict flow to the at discrete circumferential locations of the flow regulator notches;

FIG. 17 is a detail view of a portion of FIG. 16 showing the thermostatic valve in the second opening position, in which the primary seal ring is disengaged from the housing cap while the side walls of flow regulators are partially engaged with the seating surfaces of the housing to allow the high-level metered fluid flow to pass through the thermostatic valve and the secondary seal ring maintains engagement with the housing cap to restrict flow to the at discrete circumferential locations of the flow regulator notches;

FIG. 18 is a perspective view of the thermostatic control device with the housing cap rendered transparent to show the thermostatic valve in the fully open position;

FIG. 19 is a cross-sectional view of the thermostatic control device of FIG. 18 showing that the valve actuator has extended the stem to drive movement of the thermostatic valve from the second opening position to the fully open position in which the primary seal ring, flow regulators, and secondary seal ring are disengaged from the valve seating surfaces of the housing cap to allow flow, for the first time, around the entire circumference of the thermostatic valve; and FIG. 20 is a detail view of a portion of FIG. 19 showing the thermostatic valve in the fully open position in which the primary seal ring, flow regulators, and secondary seal ring are disengaged from the valve seating surfaces of the housing cap.

DETAILED DESCRIPTION

A thermostatic control device 10 is configured to control the flow of coolant fluid from a reservoir through a heat exchanging circuit and/or a bypass back to cooling circuit pump based on temperature of the coolant fluid. The thermostatic control device 10 includes a thermostatic valve 12 with flow regulators 38 formed in an over-molded sealing element 30 that provide notches 15 shaped to allow flow of coolant during opening of the thermostatic valve 12 only at circumferentially spaced apart locations around the thermostatic valve 12. These notches 15 regulate the increasing flow of coolant during opening to avoid excess flow until the thermostatic valve 12 is fully open. By regulating flow during opening, the thermostatic control device 10 can avoid oscillation of the thermostatic valve 12.

Figure 2:
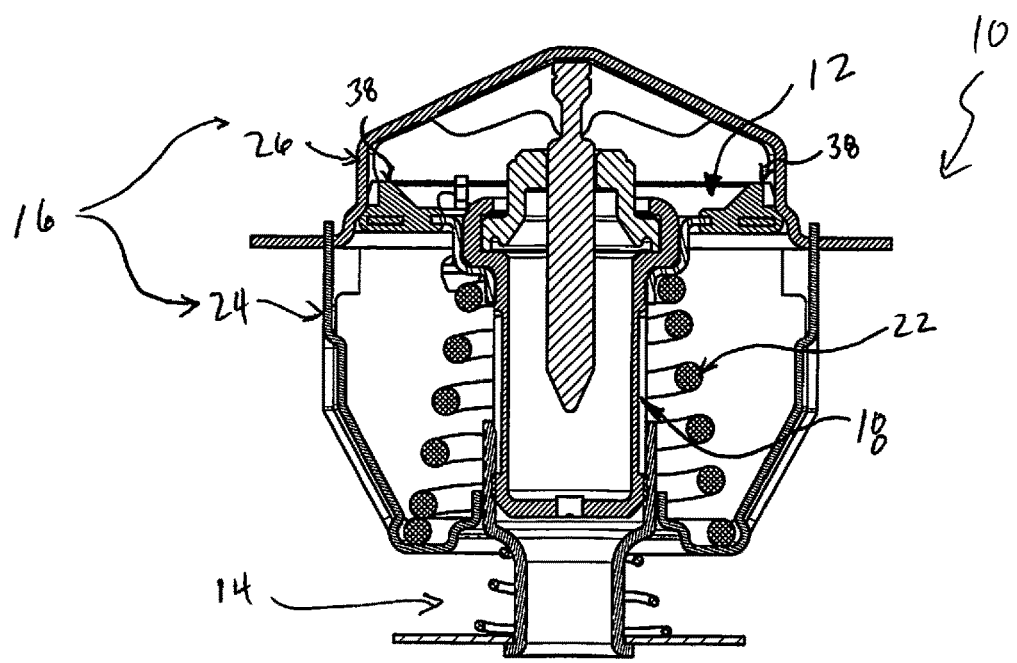
FIG. 2 is partially diagrammatic system view of a system with a cross-sectional view of the thermostatic control device of FIG. 1 showing the thermostatic valve in a fully closed position with the over-molded sealing element engaged with valve seat surface of a housing cap to block the flow of cooling fluid through the thermostatic control device toward a heat exchanger.
Figure 3:
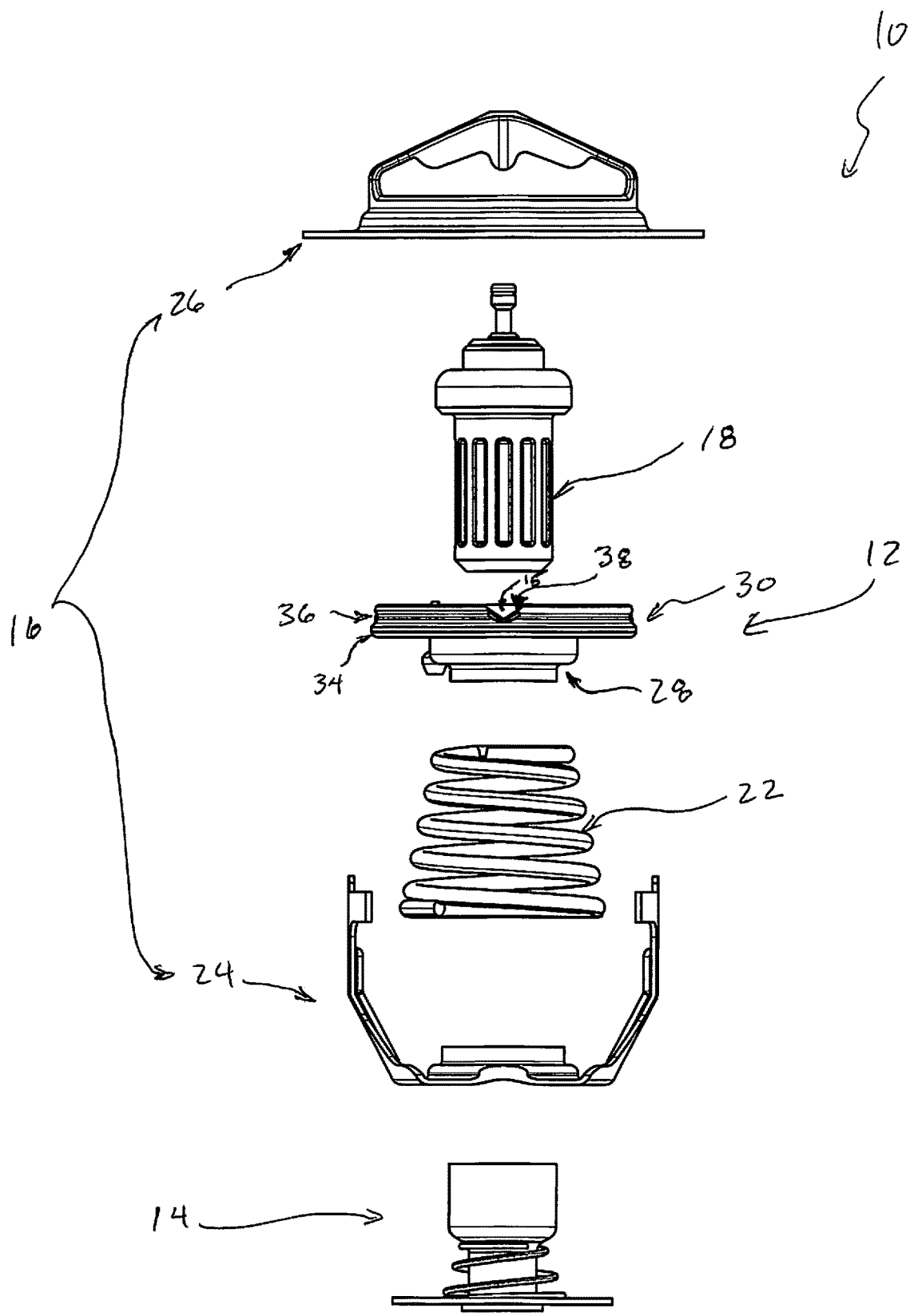
FIG. 3 is an exploded front elevation assembly view of the thermostatic control device of FIGS. 1 and 2 showing that the device includes—from bottom to top—a bypass valve, a housing base, a thermostatic valve bias spring, the thermostatic valve, a valve actuator, and a housing cap.

The illustrative thermostatic device 10 includes the thermostatic valve 12, a housing 16, and a valve actuator 18 as shown in FIGS. 2 and 3. The thermostatic valve 12 is mounted in the housing 16 to move along an axis 11 from a fully closed position to a fully opened position. The valve actuator 18 is illustratively a wax motor configured to overcome the force of a valve bias spring 22 to move the thermostatic valve 12 from a normally, fully closed position to a fully opened position based on the temperature of cooling fluid. The device 10 further includes a bypass valve 14 coupled to housing 16.

Figure 1:
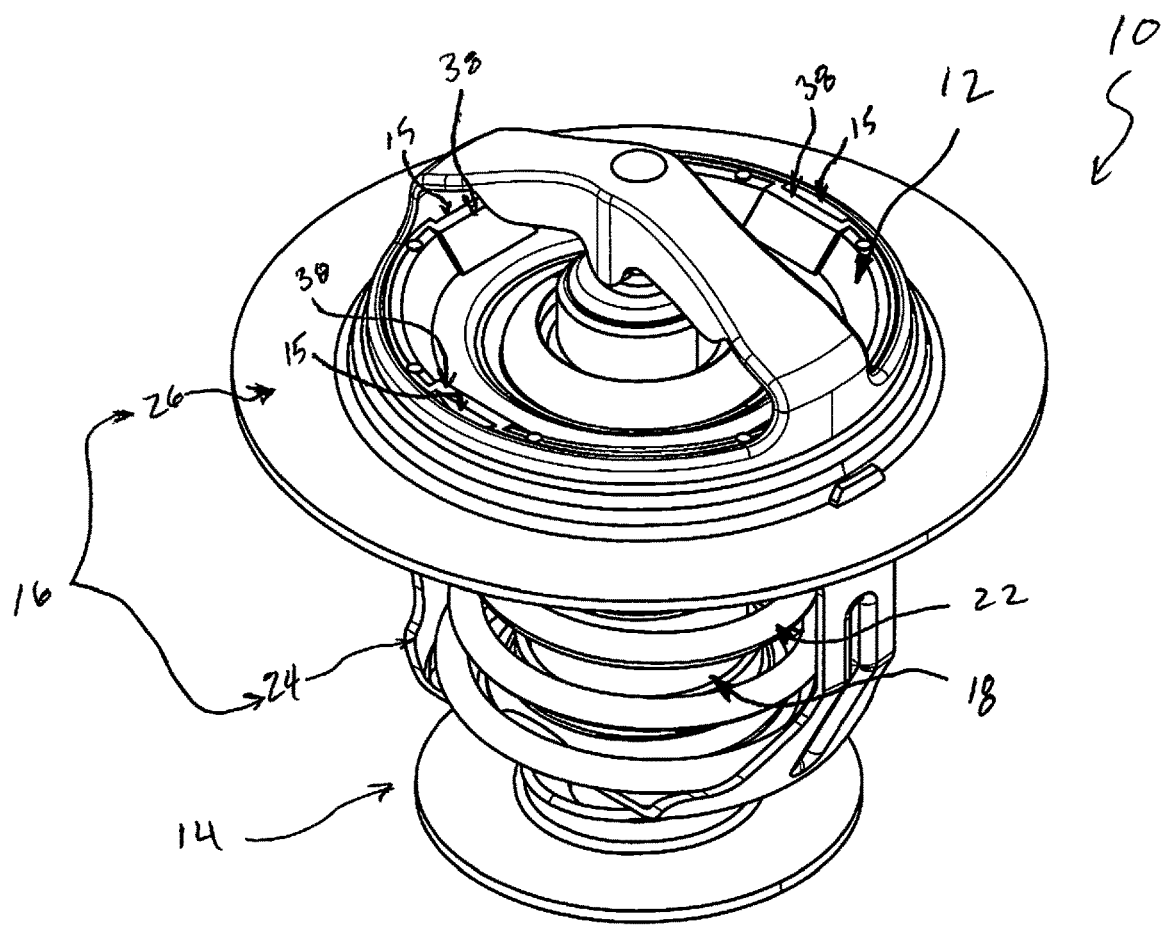

The housing 16 is mounted in a coolant fluid circuit and supports the other components of the device 10 as suggested in FIGS. 1 and 2. The housing 16 illustratively includes a housing base 24 and a housing cap 26. The cap 26 provides seating surfaces for the thermostatic valve 12 as shown in FIG. 8. In particular, the cap 26 has a first seating surface 44 and a second seating surface 46.

The thermostatic valve 12 is made up of a metal insert ring 28 and the over-molded seal element 30 as shown in FIGS. 4 and 5. The over-molded seal element 30 includes a seal body 32, a primary seal ring 34, a secondary seal ring 36, and a plurality of flow regulators 38. The seal body 32 is engaged with the metal insert ring 28. The primary seal ring 34 extends radially outwardly from the seal body 32. The secondary seal ring 36 is spaced from the primary seal ring 34 to form a channel 35 between the primary and secondary seal rings. The circumferentially spaced apart flow regulators 38 interrupt the secondary seal ring 36 at discrete circumferential locations.

The primary seal ring 34 engages the first seating surface 44 of the housing cap 26 when the valve 12 is in the fully closed position as shown in FIG. 8. When the valve 12 begins moving toward the fully opened position, the primary seal ring 34 disengages the first seating surface 44 as shown in FIG. 11.

The secondary seal ring 36 includes an uninterrupted, annular portion 361 into which the flow regulators 38 do not extend as shown in FIGS. 5, 8, and 11. The uninterrupted annular portion 361 is shaped and arranged to engage the second valve seating surface 46 to block flow of cooling fluid upon disengagement of the primary seal ring 34 from the first seating surface 44 as shown in FIG. 11. This continued blockage after disengagement of the primary seal ring 34 helps stabilize the valve 12 and avoid radial leakage during opening at locations other than at the flow regulators 38 during continued opening of the valve 12.

The flow regulators 38 are equidistantly circumferentially spaced apart at four locations around the axis 11 as shown in FIG. 5. This number and spacing lead to balance of the thermostatic valve 12 during motion within housing 16. The flow regulators 38 each include an interior wall 40 and side walls 41, 42. The side walls 41, 42 extend radially outward from the interior wall 40 relative to the axis 11.

The flow regulators are shaped to define controlled flow notches 15 as shown in FIG. 5. The flow regulators illustratively form a V-shape with a defined bottom point at the annular, uninterrupted portion 361 of the secondary seal ring 36 when the thermostatic valve 12 is viewed radially-inwardly toward the axis 11 as shown in FIG. 4. Other shapes are also contemplated, including U-shape and other shapes conducive to controlling the passage of coolant fluid during valve 12 opening.

In the illustrated embodiment, the first seating surface 44 forms an obtuse angle with the second seating surface 46. The second seating surface 46 extends as a cylinder around and facing the axis 11.

In operation, the thermostatic valve 12 moves from the fully closed position shown in FIGS. 6-8 to the fully opened position shown in FIGS. 18-20. In the fully closed position, coolant fluid is blocked from moving past the valve 12 by both the primary valve ring 34 and the secondary seal ring 36 that are both engaged with the housing cap 26 as shown in FIG. 8.

During motion from fully closed to fully opened, the valve 12 moves first to a pre-opening position as shown in FIGS. 9-11. In the pre-opening position, the primary seal ring 34 disengages from the first seat surface 44 of the housing cap 26. However, the uninterrupted, annular portion 361 of the secondary seal ring 36 remains engaged with the second seat surface 46 of the housing cap 26 to block coolant flow past the valve 12.

In the pre-opening position, the thermostatic valve 12 is stabilized with coolant fluid applying pressure to the secondary seal ring prior to metered flow being allowed to flow through the notches 15. In this way, rolling of the valve 12 and/or the overmolded seal itself can be avoided and bleed flow beginning past the pre-opening position is limited to the desired, discrete locations at the flow regulators 38.

Continued movement of the valve 12 past the pre-opening position toward the fully opened position leads the valve to a first, low-flow opening position as shown in FIGS. 12-14. In the first opening position, the primary seal ring 34 is disengaged from the housing cap 26 and the flow regulators 38 have started to allow a low-level metered fluid flow to pass through the thermostatic valve 12. The secondary seal ring 34 maintains engagement with the housing cap 26 to restrict flow to the discrete circumferential locations of the flow regulator notches 15.

As the thermostatic valve continues to move toward the fully opened position, the valve 12 moves through a second, high-flow opening position as shown in FIGS. 15-17. In the second opening position, the primary seal ring 34 is disengaged from the valve seating surfaces of the housing cap 26 and the flow regulators 38 allow a high-level metered fluid flow to pass through the thermostatic valve 12. The secondary seal ring 36 maintains engagement with the housing cap 26 to restrict flow to the discrete circumferential locations of the flow regulator notches 15.

Finally, in the fully opened position, flow is allowed all the way around the thermostatic valve 12 as shown in FIGS. 18-20. In the fully opened position, the primary seal ring 34, flow regulators 38, and secondary seal ring 36 are disengaged from the valve seating surfaces 44, 46 of the housing cap 26 to allow flow, for the first time, around the entire circumference of the thermostatic valve 12.

The invention claimed is:

1. A thermostatic control device, the device comprising
a housing shaped to include at least one valve seating surface,
a thermostatic valve mounted in the housing for movement from a fully closed position engaged with the at least one valve seating surface to block flow of cooling fluid to a fully opened position disengaged from the at least one valve seating surface to allow flow of cooling fluid around an entire circumference of the thermostatic valve, and
a valve actuator coupled to the thermostatic valve and configured to drive motion of the thermostatic valve from the fully closed position to the fully opened position in response to a rise in the temperature of the cooling fluid,
wherein the thermostatic valve includes a primary seal ring that engages the at least one valve seating surface to block flow of cooling fluid and metering means for first blocking and then allowing metered flow of the cooling fluid through the thermostatic valve during motion of the thermostatic valve from the fully closed position to the fully opened position by regulating the metered flow of cooling fluid based on the position of the thermostatic valve and restricting the flow of the metered cooling fluid to discrete, spaced-apart circumferential locations around the thermostatic valve,
wherein the metering means is provided by a secondary seal ring with flow regulators providing passageways therethrough that remains in contact with the at least one valve seating surface during opening of the thermostatic valve after disengagement of the primary seal ring, and wherein the flow regulators form a V-shape with a defined bottom point at an annular, uninterrupted portion of the secondary seal ring when the thermostatic valve is viewed radially-inwardly toward an axis of motion along which the thermostatic valve moves.

2. The device of claim 1, wherein the primary seal ring, the flow regulators, and the secondary seal ring are integrated into an over-molded seal element coupled to a metallic insert ring.

3. The device of claim 1, wherein the flow regulators each include an interior wall and side walls that extend radially outward from the interior wall relative to an axis of motion along which the thermostatic valve moves.

4. The device of claim 1, wherein the metering means includes at least three flow regulators spaced equidistantly around an axis along which the thermostatic valve moves so as to balance the thermostatic valve during motion.

5. A thermostatic control device, the device comprising
a housing shaped to include a first valve seating surface and a second valve seating surface,
a thermostatic valve mounted in the housing for movement along an axis from a fully closed position engaged with the first valve seating surface to block flow of cooling fluid to a fully opened position disengaged from the first valve seating surface to allow flow of cooling fluid around an entire circumference of the thermostatic valve, and
a valve actuator coupled to the thermostatic valve and configured to drive motion of the thermostatic valve from the fully closed position to the fully opened position in response to a rise in the temperature of the cooling fluid,
wherein the thermostatic valve includes a primary seal ring that engages the first valve seating surface to block flow of cooling fluid when the thermostatic valve is in the fully closed position, a secondary seal ring having an uninterrupted annular portion that engages the second valve seating surface to block flow of cooling fluid upon disengagement of the primary seal ring from the first valve seating surface, and a plurality of flow regulators that define notches shaped to carry metered flow across the thermostatic valve at discrete locations during motion of the thermostatic valve from the fully closed position to the fully opened position upon disengagement of the secondary seal ring from the second valve seating surface, and
wherein the flow regulators are shaped to constantly increase an area of open space through which metered flow can move across the thermostatic valve during movement of the thermostatic valve along the axis from the fully closed position to the fully opened position.

6. The device of claim 5, wherein the second valve seating surface extends around and faces the axis.

7. The device of claim 6, wherein the first valve seating surface forms an obtuse angle with the second valve seating surface.

8. The device of claim 5, wherein the primary seal ring, the flow regulators, and the secondary seal ring are integrated into an over-molded seal element coupled to a metallic insert ring.

9. The device of claim 5, wherein the flow regulators form a V-shape with a defined bottom point at an annular, uninterrupted portion of the secondary seal ring when the thermostatic valve is viewed radially-inwardly toward the axis.

10. The device of claim 5, wherein the flow regulators each include an interior wall and side walls that extend radially outward from the interior wall relative to the axis.

* * * * *